Nov. 18, 1952    H. KETEL    2,618,488

UNIVERSAL ACTION FIFTH WHEEL

Filed Oct. 4, 1951

Inventor
Henry Ketel
BY Frank E. Livermore, Jr.
Attorney

Patented Nov. 18, 1952

2,618,488

UNITED STATES PATENT OFFICE 2,618,488

UNIVERSAL ACTION FIFTH WHEEL

Henry Ketel, Holland, Mich., assignor to Holland Hitch Company, Holland, Mich., a corporation of Michigan Application October 4, 1951, Serial No. 249,694

8 Claims. (Cl. 280—33.05)

This invention relates to fifth wheels which are attached to the upper side of the rear portion of a truck or tractor, and which carry or support a trailer superimposed above the truck or tractor, to which it is releasably connected, with a pin extending downwardly from the lower side of the front portion of the trailer so carried or supported. The plate surface area of the fifth wheel in direct contact with a like area on the underside of the trailer, provides a stabilizing platform across the truck frame, and a bearing surface on which the trailer horizontally turns above the rear portion of the truck when change in direction is made. The fifth wheel plate, being connected by bearing means to support members attached to the tractor frame, is permitted to rock in a vertical arc to compensate for changes in the relative height between the front and rear ends of either the truck or trailer, but does not compensate for differences in the tilt of the truck and/or the trailer, occasioned by progressive contact with inclines and opposed depressions in the roadway travelled. This limitation has heretofore been removed by superimposing a rocker bed, trunnion bar, and rocker arm, between the fifth wheel plate and the truck frame.

With my invention, a novel structure is provided for mounting the fifth wheel plate or base for turning about a horizontal axis, which axis, at each end, is not rigidly maintained but is provided with a construction of a generally universal form which permits a controlled movement or release from strain forces in other directions than about a horizontal tilting axis. Fifth wheels heretofore have provided such universal action by means of the rocker arm trunnion pin construction, obtaining universal action by tilting on the trunnion pin supported by the rocker bed in the center between the side rails or frame of the truck. This construction increased the weight and cost of the fifth wheel mounted on the truck, and provided limited control or restraint over the tilting motion on the trunnion pin.

My invention contemplates a construction of equal strength, greater versatility, and with a controlled action obtained from the utilization of the natural forces of friction and gravity, and with decreased weight and cost. In my construction the cross tilt of the fifth wheel plate is controlled at the points of attachment to the side rails of the truck, which decreases the overhang of the load in the direction of tilt, and increases the opposite overhang slowing the tilt. This stabilization is further augmented by the friction resistance generated when the fifth wheel plate moves rotatively against the under plate of the trailer, thus absorbing the shock of sudden impact producing tilting action. Further stabilization is accomplished by the force of gravity seeking the lower common center of the suspension unit when tilting strains are absent. Thus, the strains and twists between a rigid truck frame and a rigid trailer are absorbed in the fifth wheel mounting with resultant increase in life of both truck and trailer.

An understanding of my invention may be had from the following description, taken in connection with the accompanying drawing, in which, Fig. 1 is a plan view of a fifth wheel equipped with my invention.

Like reference characters refer to like parts in the different figures of the drawing.

Figure 1:
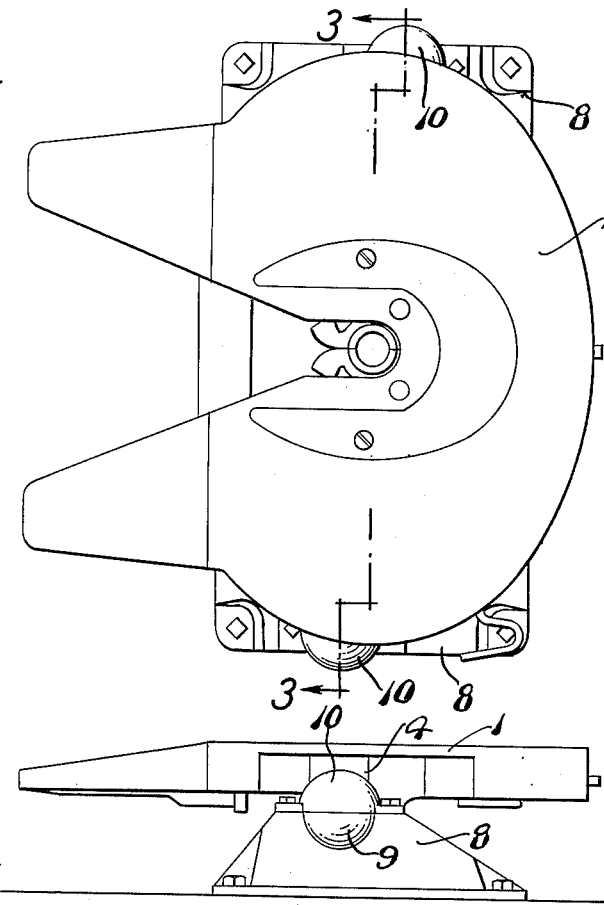
Figure 2:
Fig. 2 is a side elevation thereof.

In the structure shown in the drawing, the fifth wheel base or plate 1 is of a conventional structure, having a slot from its rear end to its center as shown, the sides of the slot diverging outwardly rearwardly so that such slot is of considerable width at its outer or free end, where the connecting pin carried at the under side of a trailer enters on backing the tractor into place, such pin being guided to the narrow inner portion of the slot and gripped by holding jaws in the usual manner.

From the base 1 at opposed sides mounting arms or brackets 2 integral therewith extend downwardly which, at their lower portions, are equipped each with an integral horizontal sleeve 3. Such sleeves extend toward each other.

Figure 4:
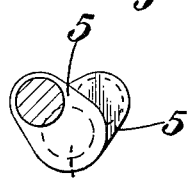
Fig. 4 is a vertical section, substantially on the plane of line 4—4 of Fig. 3, looking in the direction indicated.

With my invention two ball cranks are used. Each at its outer end has a generally spherical ball 4; connected at one side with the upper end of an arm 5 from which, at its lower end, a hollow stud 6 extends opposite the ball 4. The studs 6 are received in the sleeves 3, and securely locked in their relative positions, one to the other, as indicated in Fig. 4, by the connecting shaft 7 being inserted at its ends into the hollow studs 6, and securely keyed or otherwise locked thereto to prevent any movement of shaft 7 therein.

The balls 4 extending outwardly from the arms 5 are mounted upon supports 8 permanently secured at the upper side of the frame of a truck which is to draw a trailer. Each support 8, at its upper portion, is provided with a concave ball receiving socket 9. The balls are held in said sockets by covers bolted to the supports 8 at the upper sides thereof, each of which at its middle portion has a generally spherical arc-shaped cover 10 for the upper portion of the ball 4 with which it is associated. The supports 8 and balls 4 are so positioned that the axis of shaft 7 and an axis connecting the centers of balls 4 are not parallel but cross each other, as is evident from the location of ball housings 10, as in Fig. 1.

Thus the trailer load on the surface of the fifth wheel plate 1 is transmitted through brackets 2, to the horizontal sleeves 3 which are supported rotatively by studs 6, integral with arms 5 and balls 4, securely held in their respective relative positions, one to the other by shaft 7, supports 8 permanently secured to the trailer frame in the offset positions as shown in Fig. 1 mounting the balls 4.

The plate or base 1 rocks on the axis of shaft 7 carried on the bearings provided by studs 6 inserted in sleeves 3, whenever actuated by changes in the relative elevations of the front and rear ends of the truck, and/or trailer.

Figure 3:
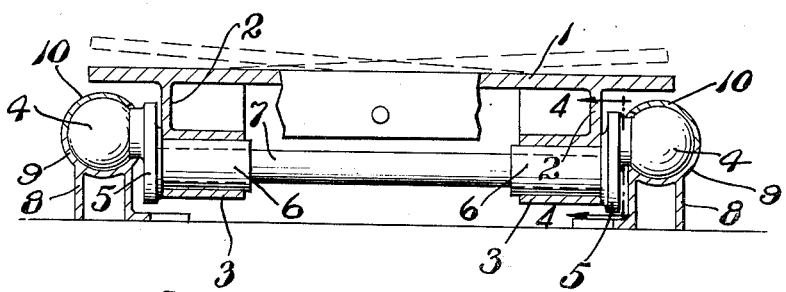
Fig. 3 is a transverse vertical section, substantially on the plane of line 3—3 of Fig. 1.

The plate or base 1 tilts, as in Fig. 3 whenever tilting strains between the truck and the trailer are encountered, by transmitting the tilting strains into a compensating rotation of the assembly (ball 4, crank 5, stud 6, shaft 7), within the recesses of receiving sockets 9 and covers 10 on supports 8.

As one stud 6 moves downward or upward through the arc subtended by crank 5, the other stud 6 moves in the opposite direction. This movement produces the tilt in Fig. 3, and at the same time produces a rotation of plate 1 against the contacting bearing area of the trailer.

The friction so generated cushions the impact of the strains producing tilting action. This cushioning is further augmented by the transfer of gravity strains on the rotative movement of assembly (ball 4, crank 5, stud 6, shaft 7) by reason of the decreased torque stress exerted by the stud 6 in its downward position, and the increased torque stress exerted by the other stud 6 in its upward position at a right angle to its supporting ball 4. When tilting strains are absent, the normal gravity pull restores the equality of the offset from center between the two studs 6, and their corresponding supporting balls 4.

The universal action which the structure permits is very practical and useful. The construction described is much lighter in weight and does away with materials of relatively high cost, such as rubber and springs and their mountings, heretofore used to resist the tendency to cross tilt when moving at high speeds around curves. The cost of manufacture is greatly reduced and, at the same time, better results are obtained and a substantial elimination of the heavy strains to which fifth wheels have been subjected at curves in the road.

The invention is defined in the appended claims and is to be considered comprehensive of all forms of structure coming within their scope.

I claim:

1. A slotted fifth wheel upper plate having two spaced horizontally located journals connected therewith and extending below the plate, two ball cranks, each having a stud adapted to be inserted through a journal, an arm to one end portion of which the outer end of the stud is integrally connected, and a ball at the opposite end of said arm extending therefrom opposite to said stud, and two spaced supports adapted to be secured to the frame of a truck having housings in which said balls are received for rotative movement therein.

2. A structure as defined in claim 1, and a horizontal shaft extending between and permanently connected to said studs.

3. A structure as defined in claim 2, the axis of said shaft and an axis through the centers of said balls being located in vertical planes disposed at an acute angle to each other, said planes crossing substantially at the middle of the length of the shaft.

4. In a fifth wheel, two spaced apart supports adapted to be permanently secured at the upper side of a tractor or a truck frame, said supports having at the upper sides thereof, each a housing of generally spherical outline, a ball in each housing, an arm at the inner side of each support and housing thereon, integral connections between said arm at the upper portion thereof and the ball, said housings having openings for passage of said connections, a cylindrical stud integral with the lower end portion of each arm extending horizontally therefrom, a slotted fifth wheel plate over said housings and over the space between them, and a downwardly extending bracket connected with said plate at the under side thereof adjacent each support, each bracket having, at its lower end portion, a horizontal sleeve through which a stud passes and in which the stud is mounted for relative rotary movement with respect to the sleeve.

5. In a fifth wheel, two spaced apart supports adapted to be permanently secured at the upper side of a tractor or a truck frame, said supports having at the upper sides thereof, each a housing of generally spherical outline, a ball in each housing, an arm at the inner side of each support and housing thereon, integral connections between said arm at the upper portion thereof and the ball, said housings having openings for passage of said connections, a hollow cylindrical stud integral with the lower end portion of each arm extending horizontally therefrom toward each other, a horizontal shaft extending between and permanently connected at its end portions with said studs entering thereinto, a slotted fifth wheel plate over said housings and over the space between them, and a downwardly extending bracket connected with said plate at the under side thereof adjacent each support, each bracket having, at its lower end portion, a horizontal sleeve through which a stud passes and in which the stud is mounted for relative rotary movement with respect to the sleeve.

6. A structure as defined in claim 5, each of said housings at the upper sides of said supports comprising, a socket of generally semi-spherical outline into which socket a ball is received, and a cover connected at the upper side of each of said supports having an inverted generally semi-circular intermediate portion lying over the upper portion of its associated ball.

7. A fifth wheel upper plate, two supports adapted to be secured at the upper side of a truck frame in spaced relation to each other, one under each side of said plate, said plate having spaced horizontal journals connected with and located below the plate, said journals having a common horizontal axis, ball cranks each including a horizontal stud, a crank arm to one end portion of which the stud is connected, and a ball connected to the opposite end portion of said crank arm and extending from said crank arm in the direction opposite to its associated stud, said studs being mounted in said journals with their horizontal axes in alignment and with the studs spaced from each other at adjacent ends, housings, one on each of said supports in which said balls are received and in which the balls have turning movement, and a shaft extending between and permanently connected at its ends to said studs.

8. A slotted fifth wheel upper plate having two spaced horizontal journals connected therewith and depending from the plate, two ball cranks, each having a stud adapted to be inserted through a journal, an arm to one end portion of which the outer end of the stud is integrally connected, and a ball at the opposite end of said arm extending therefrom opposite the said stud, two spaced supports adapted to be secured to the frame of a truck having housings in which said balls are received for movement therein, said supports being located one in front and one in back of a vertical plane perpendicular to a second vertical plane substantially coincident with the longitudinal median line of said plate, and the arms of said two ball cranks being normally disposed substantially at right angles to each other, and means extending between and permanently connecting said studs.

HENRY KETEL.

REFERENCES CITED

The following references are of record in the file of this patent:

UNITED STATES PATENTS

| Number | Name | Date |
| --- | --- | --- |
| 2,193,744 | Shriver | Mar. 12, 1940 |
| 2,289,079 | Seyferth | July 7, 1942 |
| 2,353,267 | Reid | July 11, 1944 |